United States Patent [19]

Maciulaitis et al.

[11] 4,088,299

[45] May 9, 1978

[54] SEAL ASSEMBLY

[75] Inventors: Vytautas K. Maciulaitis, Chicago; Rasikant R. Dhanani, Darien, both of Ill.

[73] Assignee: Crane Co., New York, N.Y.

[21] Appl. No.: 751,310

[22] Filed: Dec. 16, 1976

[51] Int. Cl.² .......................... F16K 1/22; F16K 1/228
[52] U.S. Cl. ..................................... 251/173; 251/174; 251/306
[58] Field of Search .................... 251/173, 174, 306

[56] References Cited

U.S. PATENT DOCUMENTS

| | | | |
|---|---|---|---|
| 3,642,248 | 2/1972 | Benware | 251/174 X |
| 3,910,555 | 10/1975 | Bertrem | 251/306 |
| 3,986,699 | 10/1976 | Wucik | 251/173 |
| 4,037,819 | 7/1977 | Kindersley | 251/306 |

*Primary Examiner*—Harold W. Weakley
*Attorney, Agent, or Firm*—Edward H. Mazer; George S. Schwind

[57] ABSTRACT

A bi-directional valve seal assembly comprising a retaining ring communicating with the valve body, the valve body and retaining ring each having a plurality of chamfers to form a recess having an inverted "V" shaped section with a pair of shoulders, and a seat ring movably located in the recess.

19 Claims, 5 Drawing Figures

SEAL ASSEMBLY

BACKGROUND AND SUMMARY OF THE INVENTION

This invention relates to a bi-directional sealing assembly having application in valves, especially butterfly valves. Butterfly valves have many advantages over other type valves in fluid flow regulation, most notable of these being low cost of manufacture, quickness of opening and low restriction to fluid flow when fully open. However, these valves have generally been limited to low pressure applications because of their inability to seal tightly at high pressures. In some prior art valves, the seals are located in grooves. In high pressure applications these seals often become dislodged from the grooves when the valves are opened, thereby rendering the valves inoperative. In others, elaborate groove arrangements for preventing seal blow-out increase the initial cost of the valve, raise the cost for repair or replacement of the seals, and increase the possibility of seal damage and misalignment. In several types of valves, the contact between the disc and valve must be made so tight to prevent leakage, that opening the valve, especially large size valves, requires a large torque. In some prior art valves utilizing a groove and an elastomeric seal, the seal can cold flow under the sealing pressures experienced, thereby decreasing seal life.

In several of these prior art valves, the seat ring has a "V" shaped groove in the rear surface in which is located a back-up ring. Both rings are located in a "T" shaped slot in the valve body. Upstream fluid under pressure enters the slot and moves the back-up ring along the groove to thereby force the seat ring forward into tighter engagement with the disc. This type of seal assembly has several inherent disadvantages which are overcome by the seal assembly of this application. Machining the inner surfaces of the "T" shaped slot is difficult. An inadequate finish on these surfaces will cause excessive wear on the seat ring and back-up ring operating in the slot resulting in early seal failure. Furthermore, the downstream section of the seat ring may deflect under the fluid pressure, resulting in possible back-up ring extrusion and damage. In addition, installation of the back-up ring and seat ring into the slot is usually difficult, requiring special techniques and frequently causing seal misalignment. Furthermore, these seals usually are not bi-directional, sealing better when the upstream side of the seal is on a particular side of the valve stem.

An object of the present invention is to provide an improved valve seal assembly which will seal tightly at high pressures, will not blow out under high system pressures, and which is operable with a relatively low torque.

A further object is to provide a relatively inexpensive, long-wearing, easily replaceable valve seal assembly.

A still further object is to provide a valve seal assembly which effectively prevents fluid flow in either direction at high pressure when the valve is closed.

The seat ring which is the subject of this invention comprises a novel combination of seat ring and recess design. In preferred embodiments of the invention shown and discussed herein, a back-up means may also be added to improve the seal performance, although the back-up means is not essential to the successful practice of every embodiment of this invention. The seat ring is located in a recess having an inverted "V" shaped section, the walls of which are easily accessible for providing a smooth finish for an extended seal life. The back-up means, if utilized, is located in the recess communicating with the seat ring. In each of the embodiments shown, fluid is permitted to enter the upstream side of the recess where it operates on the seat ring and back-up ring combination to effect fluid-tight seals with both the downstream side of the recess and with the valve closure means.

DESCRIPTION OF THE PREFERRED EMBODIMENTS

Figure 1:
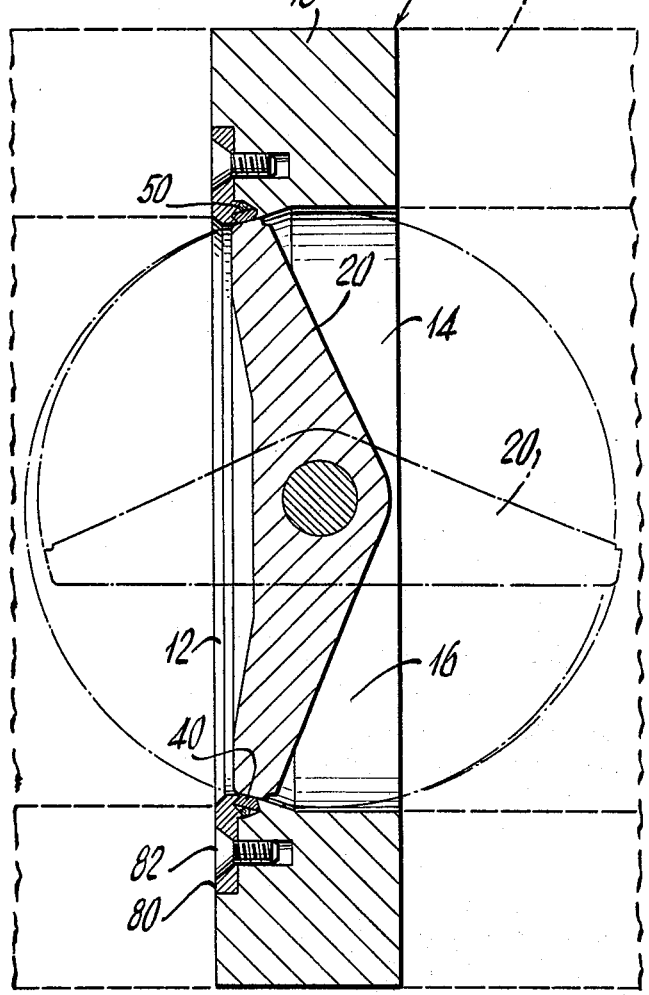
FIG. 1 is a plan sectional view of a butterfly valve utilizing the seal embodiment of this invention with the valve disc shown in solid in the closed position, and in broken lines in the open position.

Referring now to the drawings, and more particularly to the embodiment of FIG. 1, a valve generally represented as 10 having an inlet 12, outlet 14, and passage 16 in valve body 18 from inlet 12 to outlet 14 is shown located in fluid flow line 11. A valve closure means, such as rotatable disc 20, shown in solid lines in the closed position and in broken lines in the open position, is pivoted in passage 16 by a handle (not shown). Seat ring 40 and back-up ring 50 are retained in position by retaining ring 80, which is secured to valve body 18 by fasteners 82. The retaining ring is removable for insertion and removal of seat ring 40 and back-up ring 50. In this embodiment the axis of rotation of the disc does not coincide with a centerline through seat ring 40, resulting in eccentric movement of disc 20 relative to the seat ring. This eccentricity causes faster break-away between the disc and the seat ring than would result if the disc and seat ring centerlines coincided. The subject invention may be practiced, however, with coincidence of the disc axis of rotation and the seat ring centerline.

Figure 2:
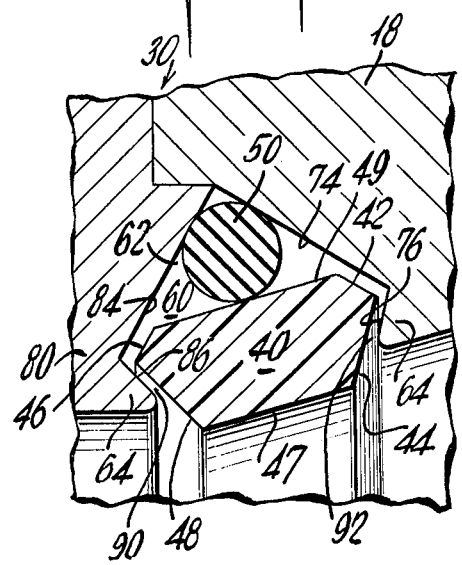
FIG. 2 is an enlargement of the subject seal assembly of FIG. 1 with the assembly unloaded. Such a condition would occur when the valve is open permitting fluid flow through the valve.
Figure 3:
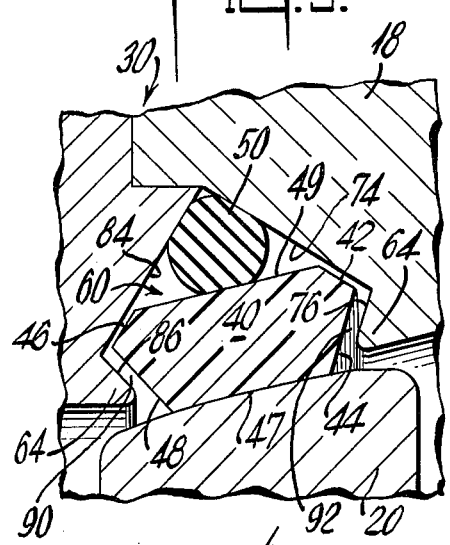
FIG. 3 is an enlargement of the subject seal assembly in a preloaded condition. Such a condition would occur if the valve disc is closed with no fluid in the valve.
Figure 4:
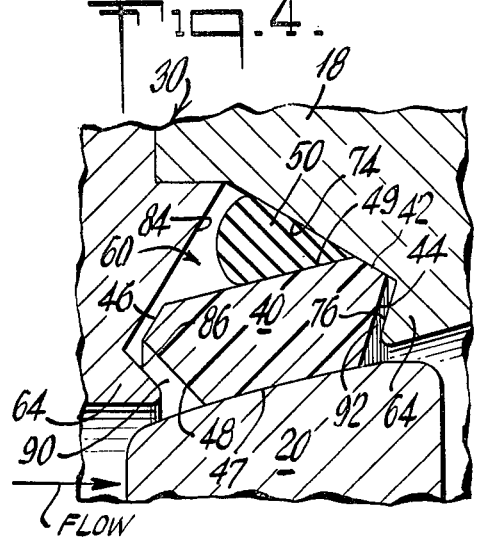
FIG. 4 is an enlargement of the assembly of FIG. 1 with the seal assembly preloaded and pressurized. This would occur when the valve is closed with fluid under pressure present therein.

Referring now to FIGS. 2, 3 and 4, seal assembly 30 is shown, comprising seat ring 40 and a back-up means, such as back-up ring 50, located in recess 60 formed by valve body 18 and retaining ring 80. Chamfered surfaces 74, 84, on valve body 18 and retaining ring 80, respectively, co-operate to form a diverging, inverted "V" shaped section 62, while chamfers 76, 86, on valve body 18 and retaining ring 80, respectively, form shoulders 64. In the embodiment shown recess 60 is of a substantially truncated-diamond shape. However, other recess shapes embodying diverging section 62 and shoulders 64 also would be satisfactory.

Seat ring 40 is movably located in recess 60 and extends into passage 16 for engagement with a valve closure means, such as valve disc 20. Seat ring 40 should be sufficiently wide so that it is retained in recess 60 by shoulders 64. Seat ring 40 may be of various designs, provided that the seat ring co-operates with both rotatable valve disc 20 and back-up ring 50 to form fluid-tight seals. In the embodiment shown, seat ring surfaces 42, 44, are shaped complementary to chamfers 74, 76 respectively, on valve body 18 while surfaces 46, 48, are shaped complementary to surfaces 84, 86, respectively, on retaining ring 80. Seat ring surface 47 co-operates with valve disc 20 to effectuate a fluid-tight seal as hereinafter described. Back-up ring 50, located in recess 60, is retained in position by chamfers 74, 84 and seat ring surface 49. The seat ring is commonly manufactured of a chemically resistant material such as a fluorocarbon polymer or a urethane. Back-up ring 50 is normally manufactured of a more resilient material such as natural rubber or synthetic elastomer. In the embodiment shown, a commercially available neoprene "O" ring could be used as the back-up ring. When fluid flow is in the direction shown by the arrow in FIG. 4, channel 90 formed between chamfers 84 and 86 of retaining ring 80 and seat ring surfaces 46, 48, will be the inlet, or higher pressure, channel, while channel 92 formed between valve terminus chamfers 74, 76 and seat ring surfaces 42, 44 will be the outlet, or lower pressure, channel.

Figure 5:
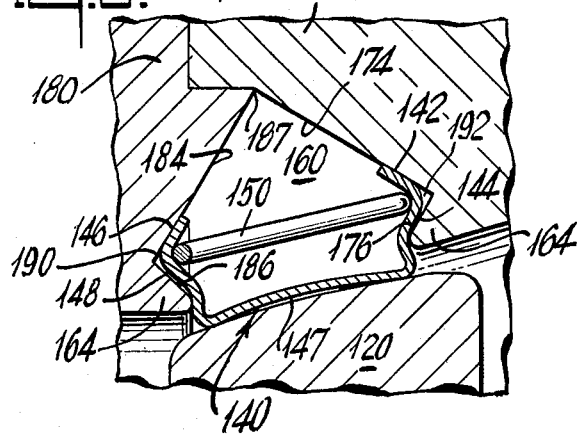
FIG. 5 is another embodiment of the seal assembly preloaded and pressurized.

When rotatable disc 20 is open, permitting fluid flow from inlet 12 to outlet 14, seat ring 40 is relatively unstressed and channels 90 and 92 are relatively wide as shown in FIG. 2. As the disc is rotated to the closed position shown in FIG. 3, the disc contacts seat ring surface 47, forcing seat ring surfaces 42, 46, closer to valve body chamfer 74, and retaining ring chamfer 84, respectively. Back-up ring 50 is compressed slightly by the co-operation of chamfers 74, 84 and surface 49. When valve 10 is closed with fluid in the system, as shown in FIG. 4, the fluid entering through inlet channel 90 acts to distort back-up ring 50 and wedge the ring between chamfer 74 and surface 49. This movement of the back-up ring forces seat ring surface 47 into fluid-tight engagement with disc 20. Simultaneously, seat ring surface 42 also is forced against chamfer 74, the seat ring thereby preventing extrusion of back-up ring 50. Back-up ring 50 thus provides a fluid-tight seal of channel 92 under hydraulic pressure in co-operation with seat ring 40, the seal remaining effective even at high differential pressures across valve 10. FIG. 5 shows an alternate embodiment, in which a hollow seat ring 140 is located in recess 160 formed by valve body 118 and retaining ring 180 of valve 110, having shoulders 164. A circumferential, zig-zag type back-up spring 150 is located in seat ring 140 to impart additional resiliency to the seat ring, although this spring is not essential for the successful practice of this invention. Seat ring surface 147 co-operates with valve disc 120 to effectuate a fluid-tight seal. Seat ring surfaces 146, 148, co-operate with complementary shaped chamfers 184, 186, respectively, on retaining ring 180 while surfaces 142, 144, co-operate with complementary shaped chamfers 174, 176, respectively, on valve body 118 to provide another fluid-tight seal as discussed below. Seat ring surfaces 142, 146, when expanded by back-up spring 150 normally are in contact with chamfers 174, 184 respectively. When valve disc 120 is being closed, fluid pressure in channel 190, coupled with the contact of valve disc 120 on surface 147, will force surface 146 away from chamfer 184 for a very short interval of time, permitting fluid to enter recess 160. The fluid acts on seat ring 140 to force surface 142 against complementary chamfer 174, thereby closing off channel 192 to fluid flow. The closure of valve disc 120 also forces seat ring 140 toward apex 187 of recess 160, resulting in tighter contact between surfaces 142, 146 and chamfers 174, 184, respectively, and in compression of seat ring 140. This results in a fluid-tight seal also being achieved between surface 147 and valve disc 120. When valve disc 120 is opened again, seat ring 140 will contract and move slightly away from apex 187 permitting some of the fluid in recess 160 to pass through channels 190, 192. Seat ring 140 and back-up spring 150 may be manufactured of steel, thereby making this embodiment especially useful for high temperature applications. Other materials which are chemically and mechanically suitable for the process conditions may be suitable, however.

It can be clearly seen that the subject seal assemblies are symmetrical and effectuate a true bi-directional seal. If fluid were to flow in the opposite direction to that shown and discussed hereinabove, the seal assembly would operate in a directly opposite manner.

In addition to the use of the invention in valves, other areas where effective fluid sealing utilizing the subject invention will become apparent. Similarly, it should be understood that variations and modifications of this invention may be effected without departing from the spirit and scope of this invention.

We claim:

1. A bi-directional valve seal assembly for preventing leakage of fluid past the valve closure means comprising:

A. a valve body having an inlet, an outlet and a passage therethrough for fluid flow;
   B. a retaining ring having a passage therethrough communicating with said valve body, said valve body and said retaining ring each having a plurality of chamfers to form a recess therebetween open to the passage, the recess having a diverging, inverted "V" shaped section and a pair of shoulders, the shoulders being adjacent to the passage;
   C. a seat ring disposed in the recess, and extending into the passage for engagement with the valve closure means, the width of said seat ring being slightly less than the corresponding width of the recess;
   D. a back-up means located in the recess communicating with said seat ring, whereby fluid entering between said seat ring and the chamfers on the inlet side of the recess forces said back-up means into co-operative engagement with said seat ring to form a fluid-tight seal between said seat ring and the valve closure means, and forces said back-up means and said seat ring into co-operative fluid-tight engagement with a chamfer on the outlet side of the recess when the valve closure means is positioned perpendicular to the passage.

2. The seal assembly of claim 1 wherein the recess has a substantially truncated-diamond shape configuration.

3. The seal assembly of claim 2 wherein said back-up means is a back-up ring.

4. The seal assembly of claim 3 wherein the surfaces of said seat ring adjacent to the chamfers are substantially complementary to the adjacent chamfers.

5. The seal assembly of claim 4 wherein the axis of rotation of the disc does not coincide with the centerline through said seat ring.

6. A bi-directional valve seal assembly for preventing the leakage of fluid past the valve closure means comprising:
   A. a valve body having an inlet, an outlet and a passage from the inlet to the outlet;
   B. a retaining ring communicating with said valve body, said valve body and said retaining ring each having a plurality of chamfers therein, said chamfers co-operating to form a recess having a generally truncated-diamond shape configuration;
   C. a seat ring disposed in the recess, said seat ring extending into the passage for engagement with the valve closure means, the width of said seat ring being slightly less than the corresponding width of the recess to thereby form an inlet channel between the inlet side of the recess and said seat ring, and an outlet channel between the outlet side of the recess and said seat ring when said valve closure means is open;
   D. a back-up means located in the recess communicating with said seat ring whereby fluid enters the recess from the inlet channel and forces said back-up means and said seat ring into co-operative fluid-tight engagement with a chamfer on the outlet channel and forces said back-up means into co-operative engagement with said seat ring to thereby form a fluid-tight seal between said seat ring and the valve closure means when the valve closure means is positioned to block flow through the valve.

7. The seal assembly of claim 6 wherein said back-up means is a back-up ring.

8. The seal assembly of claim 7 wherein the surfaces of said seat ring adjacent to the chamfers are substantially complementary to the adjacent chamfers.

9. The seal assembly of claim 8 wherein said seat ring material is selected from the group of materials consisting of fluorocarbon polymers and urethanes and wherein the back-up ring material is selected from the group of materials consisting of natural rubber and synthetic elastomers.

10. A bi-directional valve seal assembly for preventing leakage of fluid past the valve closure means comprising:
   A. a valve body having an inlet, an outlet and a passage therethrough for fluid flow;
   B. a retaining ring having a passage therethrough communicating with said valve body, said valve body and said retaining ring each having a plurality of chamfers to form a recess therebetween open to the passage, the recess having a diverging, inverted "V" shaped section and a pair of shoulders, the shoulders being adjacent to the passage;
   C. a seat ring disposed in the recess and extending into the passage for engagement with the valve closure means, the width of said seat ring being slightly less than the corresponding width of the recess, whereby fluid from the inlet entering between said seat ring and the chamfers on the inlet side of the recess forces said seat ring into fluid-tight engagement with a chamfer on the outlet side of the recess and into fluid-tight engagement with the valve closure means when the valve closure means is positioned perpendicular to the passage.

11. The seal assembly of claim 10 wherein the recess has a substantially truncated-diamond shape configuration.

12. The seal assembly of claim 11 wherein said seat ring is substantially hollow.

13. The seal assembly of claim 12 further comprising a back-up spring located in said seat ring.

14. The seal assembly of claim 13 wherein the surfaces of said seat ring adjacent to the chamfers are substantially complementary to the adjacent chamfers.

15. A bi-directional valve seal assembly for preventing the leakage of fluid past the valve closure means comprising:
   A. a valve body having an inlet, an outlet and a passage from the inlet to the outlet;
   B. a retaining ring communicating with said valve body, said valve body and said retaining ring each having a plurality of chamfers therein, said chamfers co-operating to form a recess having a generally truncated-diamond shape configuration;
   C. a seat ring disposed in the recess, said seat ring extending into the passage for engagement with the valve closure means, whereby fluid entering the recess between the chamfers on the inlet side of the recess and the inlet side of the seat ring forces the opposite side of said seat ring into sealing engagement with a chamfer on the outlet side of the recess and whereby said seat ring is compressed by, and forms a fluid-tight seal with, the valve closure means when the valve closure is positioned to block fluid flow through the valve.

16. The seal assembly of claim 15 wherein the surfaces of said seat ring adjacent to the chamfers are substantially complementary to the adjacent chamfers.

17. The seal assembly of claim 16 further comprising a back-up means located in the recess communicating with said seat ring, said back-up means co-operating with said seat ring to force said seat ring into fluid-tight engagement with a chamfer on the outlet side of the recess and to force said seat ring into fluid-tight engagement with the valve closure means when the valve closure means is positioned to prevent fluid flow.

18. The seal assembly of claim 17 wherein said back-up means is a back-up spring and wherein said seat ring is substantially hollow, said back-up spring being located in the hollow portion of said seat ring.

19. The seal assembly of claim 18 wherein said back-up spring and said seat ring are of metal construction.

* * * * *